(12) United States Patent
Zhao et al.

(10) Patent No.: US 12,107,691 B2
(45) Date of Patent: Oct. 1, 2024

(54) DUPLICATION TRANSMISSION MAINTAINING METHOD, TERMINAL AND NETWORK DEVICE

(71) Applicant: DATANG MOBILE COMMUNICATIONS EQUIPMENT CO., LTD., Beijing (CN)

(72) Inventors: Yali Zhao, Beijing (CN); Li Chen, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 0 days.

(21) Appl. No.: 17/624,327

(22) PCT Filed: Jun. 1, 2020

(86) PCT No.: PCT/CN2020/093739
§ 371 (c)(1),
(2) Date: Dec. 31, 2021

(87) PCT Pub. No.: WO2021/000681
PCT Pub. Date: Jan. 7, 2021

(65) Prior Publication Data
US 2022/0360369 A1 Nov. 10, 2022

(30) Foreign Application Priority Data
Jul. 4, 2019 (CN) .......................... 201910598890.3

(51) Int. Cl.
*H04L 1/1867* (2023.01)
(52) U.S. Cl.
CPC .............. *H04L 1/189* (2013.01); *H04L 1/188* (2013.01)

(58) Field of Classification Search
CPC .............................. H04L 1/189; H04L 1/188
See application file for complete search history.

(56) References Cited

U.S. PATENT DOCUMENTS

| 2018/0324642 | A1 | 11/2018 | Yu et al. |
| 2019/0098533 | A1 | 3/2019 | Babaei et al. |
| 2019/0158229 | A1* | 5/2019 | Wei .................. H04L 1/1848 |
| 2019/0246378 | A1* | 8/2019 | Islam ................ H04L 1/1819 |

(Continued)

FOREIGN PATENT DOCUMENTS

| CN | 107241164 A | 10/2017 |
| CN | 107567718 A | 1/2018 |
| CN | 109792327 A | 5/2019 |
| CN | 109937587 A | 6/2019 |
| WO | 2015176748 A1 | 11/2015 |

(Continued)

OTHER PUBLICATIONS

"Reordering timer for PDCP operation with duplication", 3GPP TSG-RAN WG2 NR AH #3, R2-1801256, Vancouver, Canada, Jan. 22- Jan. 26, 2018, Agenda item: 10.3.1.11, Source: Sequans Communications.

(Continued)

*Primary Examiner* — Benjamin H Elliott, IV
*Assistant Examiner* — Nevena Zecevic Sandhu
(74) *Attorney, Agent, or Firm* — Ladas & Parry, LLP (57) ABSTRACT

A duplication transmission maintaining method, a terminal, and a network device are provided, related to the field of communications. The duplication transmission maintaining method includes: maintaining a duplication transmission timer for a first duplication transmission of a target bearer.

15 Claims, 3 Drawing Sheets

(56) References Cited

U.S. PATENT DOCUMENTS

| | | | |
|---|---|---|---|
| 2019/0327641 A1 | 10/2019 | Mok et al. | |
| 2020/0245395 A1* | 7/2020 | Zhang | H04L 5/0053 |
| 2020/0322980 A1* | 10/2020 | Fakoorian | H04L 1/1819 |
| 2021/0075548 A1 | 3/2021 | Shi | |
| 2021/0399846 A1* | 12/2021 | Kuo | H04W 72/569 |

FOREIGN PATENT DOCUMENTS

| | | | |
|---|---|---|---|
| WO | 2018131975 A1 | 7/2018 | |
| WO | 2018203697 A | 11/2018 | |

OTHER PUBLICATIONS

"Enhancement of resource efficiency for PDCP duplication", 3GPP TSG-RAN2 Meeting #106, R2-1905751, Reno, USA, May 13-May 17, 2019, Agenda Item: 11.7.4, Source: CATT.

"Implicit Activation and Deactivation of PDCP Duplication", 3GPP TSG-RAN WG2 Meeting #JOJ, R2-1803592, Athens, Greece, Feb. 26-Mar. 2, 2018, Agenda Item: 10.3.1.11, Source: Samsung.

Written Opinion for PCT Application PCT/CN2020/093739 issued on Jul. 29, 2020, and its English Translation provided by WIPO.

International Search Report for PCT Application PCT/CN2020/093739 issued on Jul. 29, 2020, and its English Translation provided by WIPO.

International preliminary report on patentability for PCT Application PCT/CN2020/093739 mailed on Dec. 28, 2021, and its English Translation provided by WIPO.

First Office Action and search report for Chinese Patent Application 201910598890.3 issued on May 24, 2021, and its English Translation.

Extended European Search Report for European Patent Application 20834126.3 issued on Jul. 25, 2022 by the European Patent Office.

* cited by examiner

FIG. 1

FIG. 2 maintaining a duplication transmission timer for a first duplication transmission of a target bearer — 31

DUPLICATION TRANSMISSION MAINTAINING METHOD, TERMINAL AND NETWORK DEVICE

CROSS-REFERENCE TO RELATED APPLICATIONS

The present application is the U.S. national phase of PCT Application PCT/CN2020/093739 filed on Jun. 1, 2020, which claims a priority to Chinese patent application No. 201910598890.3 filed on Jul. 4, 2019, the disclosures of which are incorporated herein by reference in their entireties.

TECHNICAL FIELD

The present disclosure relates to the field of communications, and in particular, to a duplication transmission maintaining method, a terminal, and a network device.

BACKGROUND

Currently, for Packet Data Convergence Protocol (PDCP) duplication transmission, only explicit duplication transmission activation/deactivation of a network is supported, which is not flexible enough, and may cause a terminal to perform ping-pong handover between a duplication transmission activation state and a duplication transmission deactivation state.

SUMMARY

The embodiment of the disclosure provides a duplication transmission maintaining method, a terminal and a network device, so as to solve the issues that the activation/deactivation mode of duplication transmission in the related art is not flexible enough and the terminal may perform a ping-pong switching between the activation and deactivation states of duplication transmission.

In order to solve the foregoing technical issues, a duplication transmission maintaining method is provided in the present disclosure, applied to a terminal and including:

maintaining a duplication transmission timer for a first duplication transmission of a target bearer.

Optionally, the target bearer is a bearer of which the first duplication transmission is activated.

Optionally, the first duplication transmission includes one of:

a packet data convergence protocol PDCP layer duplication transmission, a radio link control RLC layer duplication transmission, a medium access control MAC layer duplication transmission or a physical layer duplication transmission.

Optionally, the maintaining the duplication transmission timer for the first duplication transmission of the target bearer includes at least one of:

receiving an activation signaling for the first duplication transmission of the target bearer and sent by network device, and starting the duplication transmission timer corresponding to the first duplication transmission of the target bearer; or the terminal determining to activate first duplication transmission for the target bearer and starting the duplication transmission timer corresponding to the first duplication transmission of the target bearer.

Optionally, the maintaining the duplication transmission timer for the first duplication transmission of the target bearer includes at least one of:

during a running period of the duplication transmission timer corresponding to the first duplication transmission of the target bearer, the terminal receiving the activation signaling for the first duplication transmission of the target bearer and sent by network device, and restarting the duplication transmission timer corresponding to the first duplication transmission; or during a running period of the duplication transmission timer corresponding to the first duplication transmission of the target bearer, the terminal restarting the duplication transmission timer corresponding to the first duplication transmission every time the terminal performs the first duplication transmission.

Optionally, the maintaining the duplication transmission timer for the first duplication transmission of the target bearer includes further includes:

deactivating the first duplication transmission of the target bearer when the duplication transmission timer expires.

Optionally, the maintaining the duplication transmission timer for the first duplication transmission of the target bearer includes at least one of:

the terminal receiving an activation signaling or a deactivation signaling for the first duplication transmission of the target bearer and sent by network device, and starting the duplication transmission timer corresponding to the first duplication transmission of the target bearer; or the terminal determining to activate or deactivate the first duplication transmission for the target bearer and starting a duplication transmission timer corresponding to the first duplication transmission of the target bearer.

Optionally, the maintaining the duplication transmission timer for the first duplication transmission of the target bearer includes at least one of:

during the running period of the duplication transmission timer corresponding to the first duplication transmission of the target bearer, prohibiting the terminal from activating or deactivating the first duplication transmission; or after the duplication transmission timer for the first duplication transmission of the target bearer expires, allowing the terminal to activate or deactivate the first duplication transmission.

Optionally, a timing duration of the duplication transmission timer is preconfigured or configured by the network device.

A duplication transmission maintaining method is further provided in the present disclosure, applied to network device and including:

maintaining a duplication transmission timer for a first duplication transmission of a target bearer.

Optionally, the target bearer is a bearer of which the first duplication transmission is activated.

Optionally, the first duplication transmission includes one of:

a packet data convergence protocol PDCP layer duplication transmission, a radio link control RLC layer duplication transmission, a medium access control MAC layer duplication transmission or a physical layer duplication transmission.

Optionally, the maintaining the duplication transmission timer for the first duplication transmission of the target bearer includes at least one of:

sending an activation signaling for the first duplication transmission of the target bearer to a terminal, and starting the duplication transmission timer corresponding to the first duplication transmission of the target bearer; or receiving indication information indicating that the terminal determines to activate first duplication transmission for the target bearer, and starting the duplication transmission timer corresponding to the first duplication transmission of the target bearer.

Optionally, the maintaining the duplication transmission timer for the first duplication transmission of the target bearer includes at least one of:

during a running period of the duplication transmission timer corresponding to the first duplication transmission of the target bearer, sending the activation signaling for the first duplication transmission of the target bearer to the terminal, and restarting the duplication transmission timer corresponding to the first duplication transmission; or during a running period of the duplication transmission timer corresponding to the first duplication transmission of the target bearer, restarting the duplication transmission timer corresponding to the first duplication transmission every time receiving the first duplication transmission sent by the terminal.

Optionally, the maintaining the duplication transmission timer for the first duplication transmission of the target bearer further includes:

determining that the first duplication transmission of the target bearer is deactivated, when the duplication transmission timer expires.

Optionally, the maintaining the duplication transmission timer for the first duplication transmission of the target bearer includes at least one of:

sending an activation signaling or a deactivation signaling for the first duplication transmission of the target bearer to the terminal, and starting the duplication transmission timer corresponding to the first duplication transmission of the target bearer; or receiving indication information indicating that the terminal determines to activate or deactivate the first duplication transmission for the target bearer and starting a duplication transmission timer corresponding to the first duplication transmission of the target bearer.

Optionally, the maintaining the duplication transmission timer for the first duplication transmission of the target bearer further includes at least one of:

during the running period of the duplication transmission timer corresponding to the first duplication transmission of the target bearer, prohibiting the network device from sending the activation signaling or the deactivation signaling for the first duplication transmission to the terminal; or after the duplication transmission timer for the first duplication transmission of the target bearer expires, allowing the network device to send the activation signaling or the deactivation signaling for the first duplication transmission to the terminal.

A terminal is further provided in the present disclosure, including: a memory, a processor and a program stored in the memory and executable by the processor, where the processor is configured to execute the program to perform:

maintaining a duplication transmission timer for a first duplication transmission of a target bearer.

Optionally, the target bearer is a bearer of which the first duplication transmission is activated.

Optionally, the first duplication transmission includes one of:

a packet data convergence protocol PDCP layer duplication transmission, a radio link control RLC layer duplication transmission, a medium access control MAC layer duplication transmission or a physical layer duplication transmission.

Optionally, the processor is configured to execute the program to perform at least one of:

receiving an activation signaling for the first duplication transmission of the target bearer and sent by network device, and starting the duplication transmission timer corresponding to the first duplication transmission of the target bearer; or determining to activate first duplication transmission for the target bearer and starting the duplication transmission timer corresponding to the first duplication transmission of the target bearer.

Optionally, the processor is configured to execute the program to perform at least one of:

during a running period of the duplication transmission timer corresponding to the first duplication transmission of the target bearer, receiving the activation signaling for the first duplication transmission of the target bearer and sent by network device, and restarting the duplication transmission timer corresponding to the first duplication transmission; or during a running period of the duplication transmission timer corresponding to the first duplication transmission of the target bearer, restarting the duplication transmission timer corresponding to the first duplication transmission every time the terminal performs the first duplication transmission.

Optionally, the processor is configured to execute the program to perform at least one of:

receiving an activation signaling or a deactivation signaling for the first duplication transmission of the target bearer and sent by network device, and starting the duplication transmission timer corresponding to the first duplication transmission of the target bearer; or determining to activate or deactivate the first duplication transmission for the target bearer and starting a duplication transmission timer corresponding to the first duplication transmission of the target bearer.

Optionally, the processor is configured to execute the program to perform at least one of:

during the running period of the duplication transmission timer corresponding to the first duplication transmission of the target bearer, prohibiting the terminal from activating or deactivating the first duplication transmission; or after the duplication transmission timer for the first duplication transmission of the target bearer expires, allowing the terminal to activate or deactivate the first duplication transmission.

A network device is further provided in the present disclosure, including: a memory, a processor and a program stored in the memory and executable by the processor, where the processor is configured to execute the program to perform:

maintaining a duplication transmission timer for a first duplication transmission of a target bearer.

Optionally, the target bearer is a bearer of which the first duplication transmission is activated.

Optionally, the first duplication transmission includes one of:

a packet data convergence protocol PDCP layer duplication transmission, a radio link control RLC layer duplication transmission, a medium access control MAC layer duplication transmission or a physical layer duplication transmission.

Optionally, the processor is configured to execute the program to perform at least one of:
  sending an activation signaling for the first duplication transmission of the target bearer to a terminal, and starting the duplication transmission timer corresponding to the first duplication transmission of the target bearer; or
  receiving indication information indicating that the terminal determines to activate first duplication transmission for the target bearer, and starting the duplication transmission timer corresponding to the first duplication transmission of the target bearer.

Optionally, the processor is configured to execute the program to perform at least one of:
  during a running period of the duplication transmission timer corresponding to the first duplication transmission of the target bearer, sending the activation signaling for the first duplication transmission of the target bearer to the terminal, and restarting the duplication transmission timer corresponding to the first duplication transmission; or
  during a running period of the duplication transmission timer corresponding to the first duplication transmission of the target bearer, restarting the duplication transmission timer corresponding to the first duplication transmission every time receiving the first duplication transmission sent by the terminal.

Optionally, the processor is configured to execute the program to perform at least one of:
  sending an activation signaling or a deactivation signaling for the first duplication transmission of the target bearer to the terminal, and starting the duplication transmission timer corresponding to the first duplication transmission of the target bearer; or
  receiving indication information indicating that the terminal determines to activate or deactivate the first duplication transmission for the target bearer and starting a duplication transmission timer corresponding to the first duplication transmission of the target bearer.

Optionally, the processor is configured to execute the program to perform at least one of:
  during the running period of the duplication transmission timer corresponding to the first duplication transmission of the target bearer, prohibiting the network device from sending the activation signaling or the deactivation signaling for the first duplication transmission to the terminal; or
  after the duplication transmission timer for the first duplication transmission of the target bearer expires, allowing the network device to send the activation signaling or the deactivation signaling for the first duplication transmission to the terminal.

A computer-readable storage medium storing a computer program is further provided in the present disclosure, where the computer program is executed by a processor to perform the duplication transmission maintaining method hereinabove.

A terminal is further provided in the present disclosure, including:
a first maintaining module, configured to maintain a duplication transmission timer for a first duplication transmission of a target bearer.

Optionally, the target bearer is a bearer of which the first duplication transmission is activated.

Optionally, the first duplication transmission includes one of:
a packet data convergence protocol PDCP layer duplication transmission, a radio link control RLC layer duplication transmission, a medium access control MAC layer duplication transmission or a physical layer duplication transmission.

Optionally, the first maintaining module is configured to perform at least one of:
  receiving an activation signaling for the first duplication transmission of the target bearer and sent by network device, and starting the duplication transmission timer corresponding to the first duplication transmission of the target bearer; or
  determining to activate first duplication transmission for the target bearer and starting the duplication transmission timer corresponding to the first duplication transmission of the target bearer.

Optionally, the first maintaining module is configured to perform at least one of:
  during a running period of the duplication transmission timer corresponding to the first duplication transmission of the target bearer, receiving the activation signaling for the first duplication transmission of the target bearer and sent by network device, and restarting the duplication transmission timer corresponding to the first duplication transmission; or
  during a running period of the duplication transmission timer corresponding to the first duplication transmission of the target bearer, restarting the duplication transmission timer corresponding to the first duplication transmission every time the terminal performs the first duplication transmission.

A network device is further provided in the present disclosure, including:
a second maintaining module, configured to maintain a duplication transmission timer for a first duplication transmission of a target bearer.

Optionally, the target bearer is a bearer of which the first duplication transmission is activated.

Optionally, the first duplication transmission includes one of:
a packet data convergence protocol PDCP layer duplication transmission, a radio link control RLC layer duplication transmission, a medium access control MAC layer duplication transmission or a physical layer duplication transmission.

Optionally, the second maintaining module is configured to perform at least one of:
  sending an activation signaling for the first duplication transmission of the target bearer to a terminal, and starting the duplication transmission timer corresponding to the first duplication transmission of the target bearer; or
  receiving indication information indicating that the terminal determines to activate first duplication transmission for the target bearer, and starting the duplication transmission timer corresponding to the first duplication transmission of the target bearer.

Optionally, the second maintaining module is further configured to perform at least one of:
  during a running period of the duplication transmission timer corresponding to the first duplication transmission of the target bearer, sending the activation signaling for the first duplication transmission of the target bearer to the terminal, and restarting the duplication transmission timer corresponding to the first duplication transmission; or during a running period of the duplication transmission timer corresponding to the first duplication transmission of the target bearer, restarting the duplication transmission timer corresponding to the first duplication transmission every time receiving the first duplication transmission sent by the terminal.

The beneficial effect of the present disclosure is:

according to the present disclosure, a duplication transmission timer for a first duplication transmission of a target bearer is maintained, the duplication transmission deactivation can be more flexibly performed through the timer, and the issues that the terminal performs the ping-pong switching between the duplication transmission activation state and the duplication transmission deactivation state can be avoided.

DETAILED DESCRIPTION

To make the objects, technical solutions and advantages of the present disclosure more apparent, the present disclosure will be described in detail with reference to the accompanying drawings and specific embodiments.

Some concepts mentioned in the embodiments of the present disclosure are first explained as follows.

The fifth Generation (5 Generation, 5G) New air interface (New Radio, NR) system mainly supports three types of services:

enhanced Mobile Broadband communication (eMBB);

mass Machine Type Communications (mtc);

high-reliability Low-Latency Communications (Ultra-Reliable and Low Latency Communications, URLLC);

for URLLC, because of its relatively high requirements for both delay and reliability, a solution provided by the current third Generation Partnership Project (3 GPP) is to introduce a duplication transmission mechanism, that is, transmit the same Packet Data Convergence Protocol (PDCP) layer Protocol Data Unit (PDU) through multiple paths, and improve transmission reliability and reduce transmission delay through multiple transmission gains.

Figure 1:
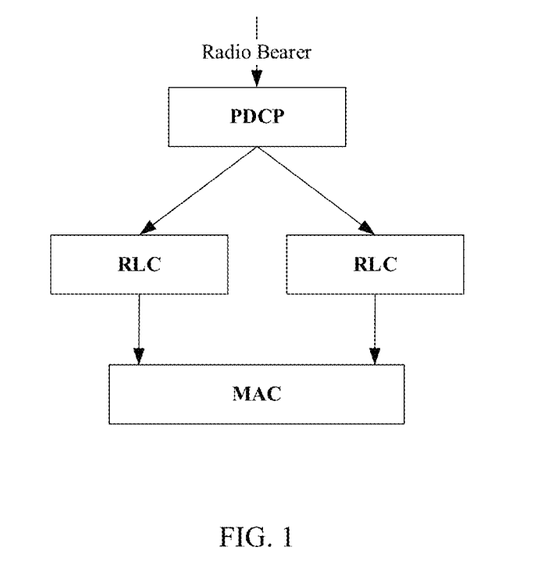
FIG. 1 shows a duplication transmission model in CA.
Figure 2:
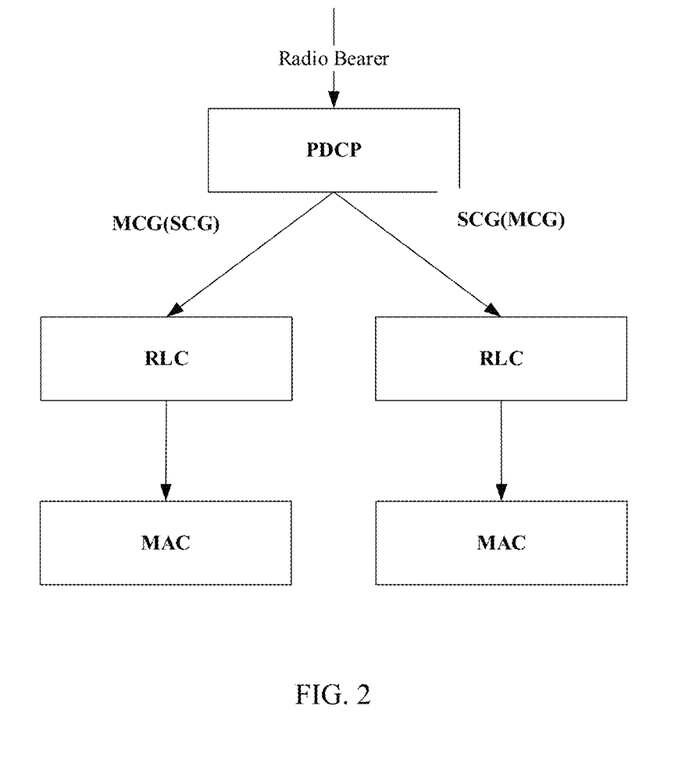
FIG. 2 shows a duplication transmission model in DC.

The models of duplication transmission in Carrier Aggregation (CA) and Dual Connectivity (DC) are shown in FIGS. 1 and 2, respectively.

That is, one Radio Bearer (RB) of the PDCP layer (where one Radio Bearer corresponds to one PDCP entity) is respectively transmitted through a plurality of Logical channels (Logical channels, where each Logical Channel corresponds to one RLC entity) in a Radio Link Control (RLC) layer. For the CA model, a plurality of logical channels corresponding to repeatedly transmitted radio bearers are processed by one MAC entity at a Medium Access Control (MAC) layer, and data from different RLC logical channels are mapped to one or more carriers for transmission. For the DC model, a plurality of logical channels corresponding to RBs enabling duplication transmission are respectively mapped to different MAC entities, and data of the plurality of logical channels are mapped to different carriers for transmission by the different MAC entities.

Currently, for PDCP duplication transmission, only explicit activation/deactivation of the network is supported, which is not flexible enough, and may cause a ping-pong handover between the states of activation and deactivation of duplication transmission, so that the enhancement scheme needs to be further considered.

The present disclosure provides a method, a terminal and a network device for maintaining duplication transmission.

Figure 3:
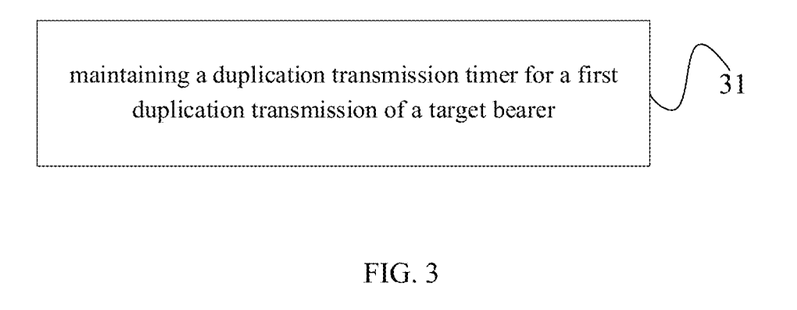
FIG. 3 is a flowchart illustrating a duplication transmission maintaining method applied to a terminal according to an embodiment of the disclosure.

As shown in FIG. 3, the duplication transmission maintaining method according to the embodiment of the present disclosure is applied to a terminal, and includes:

Step 31, maintaining a duplication transmission timer for the first duplication transmission of the target bearer.

It should be noted that, the target bearer refers to a bearer that has activated the first duplication transmission, where the first duplication transmission includes: one of Packet Data Convergence Protocol (PDCP) layer duplication transmission, Radio Link Control (RLC) layer duplication transmission, Medium Access Control (MAC) layer duplication transmission, and physical layer duplication transmission; that is, the terminal maintains its corresponding duplication transmission timer for each type of duplication transmission of the target bearer; for example, when both PDCP layer duplication transmission and MAC layer duplication transmission of a target bearer are activated, the terminal needs to maintain a duplication transmission timer corresponding to PDCP layer duplication transmission at the PDCP layer for the target bearer, and also needs to maintain a duplication transmission timer corresponding to MAC layer duplication transmission at the MAC layer for the target bearer.

Further, the timing duration of the duplication transmission timer is preconfigured or configured by the network device, and the timing durations of the duplication transmission timers corresponding to different types of duplication transmission may be the same or different.

The following describes a specific implementation of step 301 in detail from different viewpoints for achieving the object.

One, realize the goal that the implicit deactivation

In this case, the maintenance of the timer mainly includes: starting a timer, restarting the timer and the specific behavior of the terminal when the timer expires.

A11, starting of the timer

The terminal mainly starts the timer from the following two aspects:

A111, receiving an activation signaling for the first duplication transmission of the target bearer and sent by a network device, and starting a duplication transmission timer corresponding to the first duplication transmission of the target bearer;

it should be noted that, the network device sends, for the specific bearer, an activation signaling of the first duplication transmission for the terminal, and when the terminal receives the activation signaling, the terminal needs to start a duplication transmission timer corresponding to the first duplication transmission for the specific bearer. For example, the network device sends an activation signaling for PDCP layer duplication transmission of a certain bearer to the terminal, and the terminal, upon receiving the activation signaling, needs to start a duplication transmission timer corresponding to the PDCP layer duplication transmission of the certain bearer.

A112, the terminal determines to activate first duplication transmission for the target bearer and starts a duplication transmission timer corresponding to the first duplication transmission of the target bearer;

it should be noted that the activation/deactivation of the duplication transmission in this way is controlled by the terminal itself; when the terminal determines that the first duplication transmission needs to be activated for the target bearer, the terminal automatically starts a duplication transmission timer corresponding to the first duplication transmission; for example, when the terminal determines that MAC layer duplication transmission needs to be activated for a certain bearer, the terminal automatically starts a duplication transmission timer corresponding to the MAC layer duplication transmission for the bearer.

A12, restarting of the timer

The terminal mainly starts the timer from the following two aspects:

A121, during the running period of a duplication transmission timer corresponding to the first duplication transmission of the target bearer, a terminal receives an activation signaling, which is sent by a network device and is directed to the first duplication transmission of the target bearer, and restarts the duplication transmission timer corresponding to the first duplication transmission;

it should be noted that the network device may actively send the activation signaling of the first duplication transmission according to a requirement, and when the duplication transmission timer corresponding to the first duplication transmission of the terminal is in a running period, if the terminal receives the activation signaling sent by the network device, the terminal needs to restart the duplication transmission timer corresponding to the first duplication transmission.

For example, during the operation of the duplication transmission timer corresponding to the RLC layer duplication transmission for a specific bearer, if the terminal receives an activation signaling of the RLC layer duplication transmission sent by the network device for the specific bearer, the terminal restarts the duplication transmission timer corresponding to the RLC layer duplication transmission for the specific bearer.

A122, in the running period of a duplication transmission timer corresponding to a first duplication transmission carried by the target, restarting the duplication transmission timer corresponding to the first duplication transmission once every time the terminal performs the first duplication transmission;

it should be noted that, the terminal may perform the first duplication transmission for the specific bearer multiple times, and in a period of operation of the duplication transmission timer corresponding to the first duplication transmission, the terminal needs to restart the duplication transmission timer corresponding to the first duplication transmission for the specific bearer once the terminal performs the first duplication transmission for the specific bearer.

A13, detailed behavior of terminal when the timer expire

It should be noted that, when the duplication transmission timer expires, the first duplication transmission is deactivated for the target bearer.

That is, when the duplication transmission timer corresponding to the first duplication transmission of the terminal expires, indicating that the first duplication transmission cannot be continuously maintained in the active state, the terminal needs to directly deactivate the first duplication transmission.

It should be noted that, in the above implementation manner, the terminal may autonomously determine whether to deactivate the corresponding duplication transmission according to the running condition of the duplication transmission timer, thereby implementing implicit deactivation of the duplication transmission, so that the duplication transmission activation/deactivation manner is more flexible.

Secondly, the purpose of avoiding the ping-pong switching of the terminal in the state of duplication transmission activation/deactivation is realized In this case, the maintenance of the timer mainly includes: starting a timer, running the timer, and the specific behavior of the terminal when the timer times out.

A21, starting of timer

The terminal mainly starts the timer from the following two aspects:

a211, a terminal receives an activation signaling or a deactivation signaling for a first duplication transmission of a target bearer and sent by network device, and starts a duplication transmission timer corresponding to the first duplication transmission of the target bearer;

it should be noted that the network device may send an activation signaling or a deactivation signaling of the first duplication transmission to the terminal, and when the terminal receives the activation signaling or the deactivation signaling, it needs to start a duplication transmission timer corresponding to the first duplication transmission. For example, the network device sends an activation signaling for duplication transmission of a PDCP layer of a certain bearer to the terminal, and the terminal needs to start a duplication transmission timer corresponding to the duplication transmission of the PDCP layer of the bearer when receiving the activation signaling; for example, the network device sends a deactivation signaling for duplication transmission of the RLC layer of a certain bearer to the terminal, and the terminal needs to start a duplication transmission timer corresponding to duplication transmission of the RLC layer of the bearer when receiving the deactivation signaling.

A212, the terminal determines to activate or deactivate the first duplication transmission for the target bearer, and starts a duplication transmission timer corresponding to the first duplication transmission of the target bearer;

it should be noted that the activation/deactivation of the duplication transmission in this way is controlled by the terminal itself; when the terminal determines that the first duplication transmission needs to be activated or deactivated for the target bearer, the terminal automatically starts a duplication transmission timer corresponding to the first duplication transmission; for example, when the terminal determines that the MAC layer duplication transmission needs to be activated for a certain bearer, the terminal automatically starts a duplication transmission timer corresponding to the MAC layer duplication transmission for the bearer; for example, when the terminal determines that physical layer duplication transmission needs to be deactivated for the bearer, the terminal automatically starts a duplication transmission timer corresponding to physical layer duplication transmission for the bearer.

A22, detailed behavior of terminal during timer running

It should be noted that, during the running of the duplication transmission timer corresponding to the first duplication transmission of the target bearer, the terminal is prohibited from activating or deactivating the first duplication transmission.

That is to say, during the period when the duplication transmission timer corresponding to the first duplication transmission is running, the terminal does not change the state of the first duplication transmission, and even if the terminal receives the activation or deactivation signaling sent by the network device, the terminal does not perform the activation or deactivation of the first duplication transmission; for example, a terminal receives a deactivation signaling sent by a network device and addressed to duplication transmission of an RLC layer of a certain bearer, starts a duplication transmission timer corresponding to the duplication transmission of the RLC layer, and during the running period of the duplication transmission timer corresponding to the duplication transmission of the RLC layer of the bearer, the terminal cannot change the duplication transmission state of the RLC layer for the bearer, that is, during the running period of the duplication transmission timer corresponding to the duplication transmission of the RLC layer of the bearer, the duplication transmission of the RLC layer of the bearer is always in a deactivation state; for example, the terminal receives an activation signaling sent by the network device for the duplication transmission of the PDCP layer of a certain bearer, starts a duplication transmission timer corresponding to the duplication transmission of the PDCP layer for the bearer, and during the running period of the duplication transmission timer corresponding to the duplication transmission of the PDCP layer of the bearer, the terminal cannot change the state of the duplication transmission of the PDCP layer for the bearer, that is, during the running period of the duplication transmission timer corresponding to the duplication transmission of the PDCP layer of the bearer, the duplication transmission of the PDCP layer of the bearer is always in an activation state.

A23, detailed behavior of terminal when timer expires.

It should be noted that, after the duplication transmission timer corresponding to the first duplication transmission of the target bearer expires, the terminal is allowed to activate or deactivate the first duplication transmission.

That is to say, after the duplication transmission timer corresponding to the first duplication transmission expires, the terminal may change the state of the first duplication transmission according to the indication of the network device or the specific requirement of the terminal itself; for example, the terminal receives a deactivation signaling sent by the network device and directed to the duplication transmission of the RLC layer of a certain bearer, starts a duplication transmission timer corresponding to the duplication transmission of the RLC layer for the bearer, and after the duplication transmission timer corresponding to the duplication transmission of the RLC layer for the bearer expires, the terminal may activate the duplication transmission of the RLC layer for the bearer according to an activation signaling sent by the network device and directed to the duplication transmission of the RLC layer for the bearer; for example, the terminal receives an activation signaling sent by the network device and addressed to the duplication transmission of the PDCP layer of a certain bearer, starts a duplication transmission timer corresponding to the duplication transmission of the PDCP layer for the bearer, and after the duplication transmission timer corresponding to the duplication transmission of the PDCP layer for the bearer expires, the terminal may deactivate the duplication transmission of the PDCP layer for the bearer according to a deactivation signaling sent by the network device and addressed to the duplication transmission of the PDCP layer for the bearer.

It should be noted that, in this implementation manner, a behavior of activating/deactivating the first duplication transmission by the terminal may be restricted, and during an operation period of the timer corresponding to the first duplication transmission, the terminal may not change the state of the first duplication transmission, and only if the timer corresponding to the first duplication transmission is expire, the state of the duplication transmission may be changed, so that it may be avoided that the terminal performs ping-pong switching between the first duplication transmission activation state and the first duplication transmission deactivation state.

It should be noted that, in the embodiment of the present disclosure, by maintaining the duplication transmission timer for the first duplication transmission, not only the ping-pong switching between the activated state and the deactivated state when the terminal autonomously activates the duplication transmission can be avoided, but also the problem that the cell used for data transmission is limited and the resource cannot be effectively utilized because the terminal maintains the activated state for a long time without the requirement of the duplication transmission can be avoided, thereby ensuring the effective utilization of the resource and the effective transmission of the data.

Figure 4:
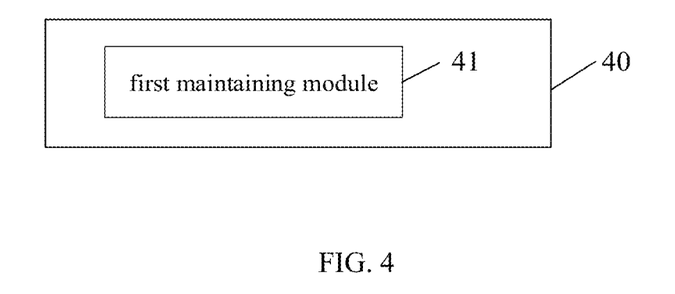
FIG. 4 is a block schematic diagram of a terminal of an embodiment of the disclosure.

As shown in FIG. 4, an embodiment of the present disclosure provides a terminal 40, including:

a first maintaining module 41, configured to maintain a duplication transmission timer for a first duplication transmission of a target bearer.

Specifically, the target bearer is a bearer that has activated the first duplication transmission.

Specifically, the first duplication transmission includes: one of packet data convergence protocol PDCP layer duplication transmission, radio link control RLC layer duplication transmission, medium access control MAC layer duplication transmission, and physical layer duplication transmission.

Optionally, the first maintaining module 41 is configured to perform at least one of:

receiving an activation signaling for the first duplication transmission of the target bearer and sent by network device, and starting a duplication transmission timer corresponding to the first duplication transmission of the target bearer;

determining to activate first duplication transmission for the target bearer and starts a duplication transmission timer corresponding to the first duplication transmission of the target bearer.

Further, the first maintaining module 41 is further configured to perform at least one of:

during the running period of the duplication transmission timer corresponding to the first duplication transmission of the target bearer, receiving an activation signaling which is sent by network device and aims at the first duplication transmission of the target bearer, and restarts the duplication transmission timer corresponding to the first duplication transmission;

restarting the duplication transmission timer corresponding to the first duplication transmission once the terminal performs the first duplication transmission once in the running period of the duplication transmission timer corresponding to the first duplication transmission of the target bearer.

Further, the first maintaining module 41 is further configured to perform:

deactivating the first duplication transmission for a target bearer when the duplication transmission timer expires.

Optionally, the first maintaining module 41 is configured to perform at least one of:

receiving an activation signaling or a deactivation signaling which is sent by network device and aims at the first duplication transmission of a target bearer, and starts a duplication transmission timer corresponding to the first duplication transmission of the target bearer;

determining to activate or deactivate the first duplication transmission for the target bearer and starts a duplication transmission timer corresponding to the first duplication transmission of the target bearer.

Further, the first maintaining module 41 is further configured to perform at least one of:

during the running period of a duplication transmission timer corresponding to the first duplication transmission of the target bearer, prohibiting the terminal from activating or deactivating the first duplication transmission;

after a duplication transmission timer corresponding to the first duplication transmission carried by the target is expire, allowing the terminal to activate or deactivate the first duplication transmission.

Specifically, the timing duration of the duplication transmission timer is preconfigured or configured by the network device.

It should be noted that the terminal embodiment is a terminal corresponding to the above method embodiment one to one, and all implementation manners in the above method embodiment are applicable to the terminal embodiment, and the same technical effect can also be achieved.

Figure 5:
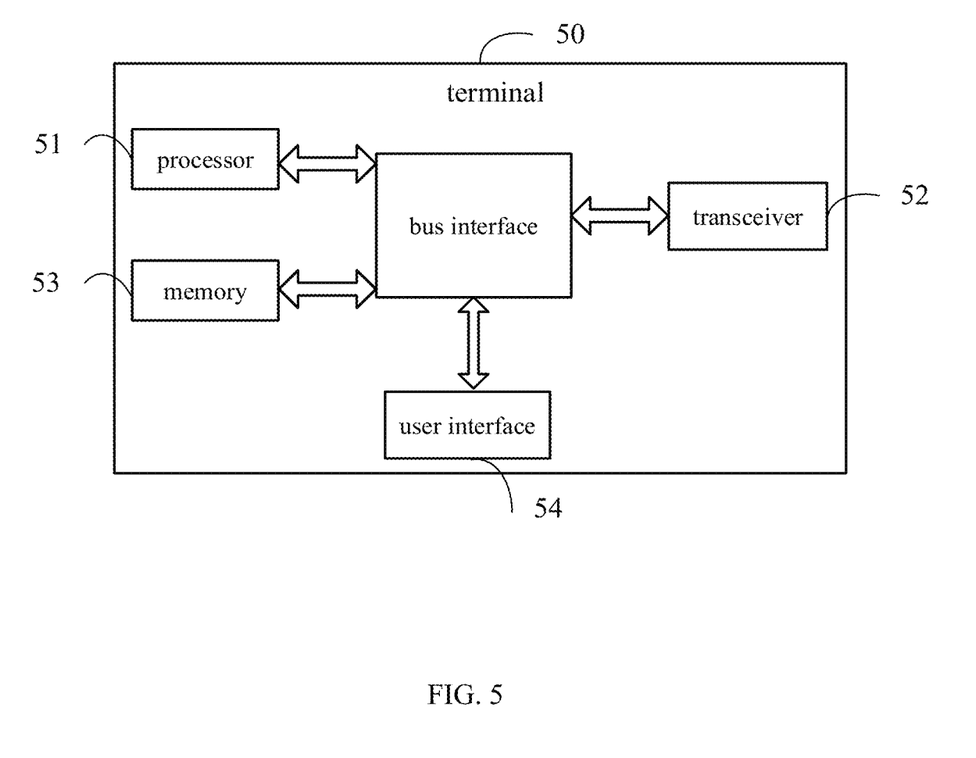
FIG. 5 is a block diagram of a terminal of an embodiment of the present disclosure.

As shown in FIG. 5, the present embodiment further provides a terminal 50, which includes a processor 51, a transceiver 52, a memory 53, and a program stored in the memory 53 and operable on the processor 51; the transceiver 52 is connected to the processor 51 and the memory 53 through a bus interface, where the processor 51 is configured to read a program in the memory and perform the following processes:

maintaining a duplication transmission timer for a first duplication transmission of a target bearer.

It should be noted that in FIG. 5, the bus architecture may include any number of interconnected buses and bridges, with one or more processors represented by processor 51 and various circuits represented by memory 53 being linked together. The bus architecture may also link together various other circuits such as peripherals, voltage regulators, power management circuits, and the like, which are well known in the art, and therefore, will not be described any further herein. The bus interface provides an interface. The transceiver 52 may be a number of elements, including a transmitter and a receiver, providing a means for communicating with various other apparatus over a transmission medium. For different senders, the user interface 54 may also be an interface capable of interfacing externally to a desired device, including but not limited to a keypad, display, speaker, microphone, joystick, etc. The processor 51 is responsible for managing the bus architecture and general processing, and the memory 53 may store data used by the processor 51 in performing operations.

Specifically, the target bearer is a bearer that has activated the first duplication transmission.

Specifically, the first duplication transmission includes: one of packet data convergence protocol PDCP layer duplication transmission, radio link control RLC layer duplication transmission, medium access control MAC layer duplication transmission, and physical layer duplication transmission.

Optionally, when the processor performs the program for maintaining the duplication transmission timer for the first duplication transmission of the target bearer, at least one of the following is implemented:

receiving, by the transceiver 52, an activation signaling for the first duplication transmission of the target bearer, sent by a network device, and starting a duplication transmission timer corresponding to the first duplication transmission of the target bearer;

the terminal determines to activate first duplication transmission for the target bearer and starts a duplication transmission timer corresponding to the first duplication transmission of the target bearer.

Further, when the processor performs the program for maintaining the duplication transmission timer for the first duplication transmission of the target bearer, at least one of the following is also implemented:

during the running period of the duplication transmission timer corresponding to the first duplication transmission of the target bearer, the terminal receives, through the transceiver 52, an activation signaling sent by the network device for the first duplication transmission of the target bearer, and restarts the duplication transmission timer corresponding to the first duplication transmission;

restarting the duplication transmission timer corresponding to the first duplication transmission once the terminal performs the first duplication transmission once in the running period of the duplication transmission timer corresponding to the first duplication transmission of the target bearer.

Further, when the processor performs the program for maintaining the duplication transmission timer for the first duplication transmission of the target bearer, the processor further implements:

deactivating the first duplication transmission for a target bearer when the duplication transmission timer expires.

Optionally, when the processor performs the program for maintaining the duplication transmission timer for the first duplication transmission of the target bearer, at least one of the following is implemented:

the terminal receives an activation signaling or a deactivation signaling for the first duplication transmission of the target bearer, which is sent by the network device, through the transceiver 52, and starts a duplication transmission timer corresponding to the first duplication transmission of the target bearer;

the terminal determines to activate or deactivate the first duplication transmission for the target bearer and starts a duplication transmission timer corresponding to the first duplication transmission of the target bearer.

Further, when the processor performs the program for maintaining the duplication transmission timer for the first duplication transmission of the target bearer, at least one of the following is also implemented:

during the running period of a duplication transmission timer corresponding to the first duplication transmission of the target bearer, prohibiting the terminal from activating or deactivating the first duplication transmission;

after a duplication transmission timer corresponding to the first duplication transmission carried by the target is expire, allowing the terminal to activate or deactivate the first duplication transmission.

Specifically, the timing duration of the duplication transmission timer is preconfigured or configured by the network device.

The disclosed embodiments also provide a computer-readable storage medium on which a computer program is stored, where the computer program, when performed by a processor, implements the steps of the duplication transmission maintaining method applied to a terminal.

Figure 6:
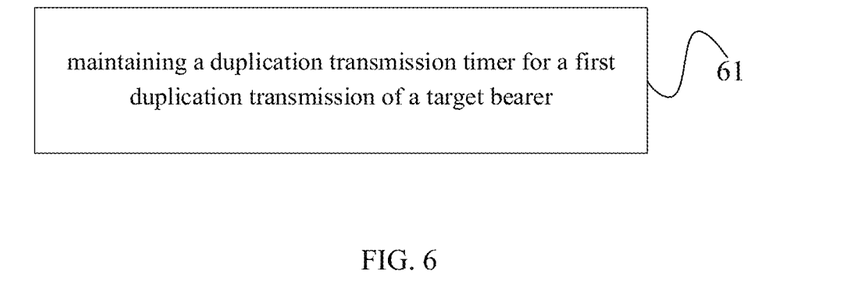
FIG. 6 is a flowchart illustrating a duplication transmission maintaining method applied to a network device according to an embodiment of the disclosure.

As shown in FIG. 6, the duplication transmission maintaining method according to the embodiment of the present disclosure is applied to a network device, and includes:

Step 601, maintaining a duplication transmission timer for the first duplication transmission of the target bearer.

It should be noted that, the target bearer refers to a bearer that has activated the first duplication transmission, where the first duplication transmission includes: one of Packet Data Convergence Protocol (PDCP) layer duplication transmission, Radio Link Control (RLC) layer duplication transmission, Medium Access Control (MAC) layer duplication transmission, and physical layer duplication transmission; that is, the terminal maintains its corresponding duplication transmission timer for each type of duplication transmission of the target bearer; for example, when both PDCP layer duplication transmission and MAC layer duplication transmission of a target bearer are activated, the terminal needs to maintain a duplication transmission timer corresponding to PDCP layer duplication transmission at the PDCP layer for the target bearer, and also needs to maintain a duplication transmission timer corresponding to MAC layer duplication transmission at the MAC layer for the target bearer.

Further, the timing durations of the duplication transmission timers corresponding to different types of duplication transmission may be the same or different.

The following describes specific implementation of step 601 in detail from different implementation objectives.

One, realize the goal that the implicit deactivation

In this case, the maintenance of the timer mainly includes: starting a timer, restarting the timer and the specific behavior of the terminal when the timer expires.

B11 starting of timer

The network device mainly starts the timer from the following two aspects:

B111, sending an activation signaling of the first duplication transmission of the target bearer to a terminal, and starting a duplication transmission timer corresponding to the first duplication transmission of the target bearer;

it should be noted that, when the network device sends the activation signaling of the first duplication transmission for the terminal for the specific bearer, the network device starts a duplication transmission timer corresponding to the first duplication transmission of the specific bearer. For example, the network device sends activation signaling for PDCP layer duplication transmission of a certain specific bearer to the terminal, and the network device simultaneously starts a duplication transmission timer corresponding to the PDCP layer duplication transmission of the specific bearer.

B112, the receiving terminal determines to activate the indication information of the first duplication transmission for the target bearer, and starts a duplication transmission timer corresponding to the first duplication transmission of the target bearer;

it should be noted that the activation/deactivation of the duplication transmission in this manner is controlled by the terminal itself, and when the terminal determines that the first duplication transmission needs to be activated for the target bearer, and when the terminal activates the first duplication transmission, the terminal sends indication information to the network device, so as to inform the network device that the first duplication transmission of the target bearer is in an activated state, and when the network device receives the indication information, the network device starts a duplication transmission timer corresponding to the first duplication transmission of the target bearer. For example, when the terminal determines that it needs to activate MAC layer duplication transmission for a certain bearer, and when the terminal activates MAC layer duplication transmission, it sends indication information to the network device to notify the network device that MAC layer duplication transmission for the bearer is already in an activated state, and when the network device receives the indication information, it starts a duplication transmission timer corresponding to MAC layer duplication transmission for the bearer.

B12 restart for timer

The network device mainly starts the timer from the following two aspects:

B121, during the running period of the duplication transmission timer corresponding to the first duplication transmission of the target bearer, sending an activation signaling for the first duplication transmission of the target bearer to a terminal, and restarting the duplication transmission timer corresponding to the first duplication transmission;

it should be noted that, the network device may actively send, according to a usage requirement, an activation signaling for the first duplication transmission of the target bearer to the terminal, and during the operation of the duplication transmission timer corresponding to the first duplication transmission of the target bearer, if the network device sends the activation signaling for the first duplication transmission to the terminal, the network device needs to restart the duplication transmission timer corresponding to the first duplication transmission.

For example, during the operation of the duplication transmission timer corresponding to the RLC layer duplication transmission for a particular bearer, if the network device sends the activation signaling for the RLC layer duplication transmission for the particular bearer again, the network device restarts the duplication transmission timer corresponding to the RLC layer duplication transmission for the particular bearer.

B122, in the running period of the duplication transmission timer corresponding to the first duplication transmission of the target bearer, restarting the duplication transmission timer corresponding to the first duplication transmission once every time the first duplication transmission sent by the terminal is received.

It should be noted that, the terminal may perform the first duplication transmission for the target bearer multiple times, and the corresponding network device may also receive the first duplication transmission multiple times, and during the operation of the duplication transmission timer corresponding to the first duplication transmission of the target bearer, the network device needs to restart the duplication transmission timer corresponding to the first duplication transmission of the target bearer once it receives the first duplication transmission one time, that is, in this case, the network device needs to restart the duplication transmission timer corresponding to the first duplication transmission several times when receiving several first duplication transmissions for the target bearer.

B13, detailed behavior of the terminal when the timer expires

It should be noted that, when the duplication transmission timer expires, it is determined that the first duplication transmission of the target bearer is in a deactivated state.

That is, when the duplication transmission timer corresponding to the first duplication transmission of the network device times out, which indicates that the first duplication transmission cannot be continuously maintained in the activated state, the network device directly determines that the first duplication transmission of the terminal is in the deactivated state.

It should be noted that, in the above implementation manner, the network device may autonomously determine whether the duplication transmission has been deactivated according to the operation condition of the duplication transmission timer, so as to perform implicit determination whether the duplication transmission is deactivated.

Secondly, the purpose of avoiding the ping-pong switching of the network device in the state of duplication transmission activation/deactivation is realized In this case, the maintenance of the timer mainly includes: starting a timer, running the timer, and the specific behavior of the terminal when the timer times out.

B21: starting of timer

The network device mainly starts the timer from the following two aspects:

b211, sending an activation signaling or a deactivation signaling for the first duplication transmission of the target bearer to a terminal, and starting a duplication transmission timer corresponding to the first duplication transmission of the target bearer;

it should be noted that, when the network device sends the activation signaling or the deactivation signaling for the first duplication transmission of the target bearer to the terminal, the duplication transmission timer corresponding to the first duplication transmission needs to be started. For example, when the network device sends an activation signaling for duplication transmission of a PDCP layer of a certain bearer to the terminal, a duplication transmission timer corresponding to the duplication transmission of the PDCP layer of the bearer is started; for example, when the network device sends a deactivation signaling for the RLC layer of a certain bearer to the terminal, the network device starts a duplication transmission timer corresponding to the RLC layer of the bearer for the duplication transmission.

B212, the receiving terminal determines the indication information for activating or deactivating the first duplication transmission for the target bearer, and starts a duplication transmission timer corresponding to the first duplication transmission of the target bearer.

It should be noted that the activation/deactivation of the duplication transmission in this way is controlled by the terminal itself; when the terminal determines that the first duplication transmission needs to be activated for the target bearer, and when the terminal activates or deactivates the first duplication transmission, the terminal sends indication information to the network device, so as to inform the network device that the first duplication transmission is in an activated state or a deactivated state, and when the network device receives the indication information, the network device starts a duplication transmission timer corresponding to the first duplication transmission. For example, when the terminal determines that it needs to activate MAC layer duplication transmission for a certain bearer, and when the terminal activates MAC layer duplication transmission, it sends indication information to the network device, so as to inform the network device that MAC layer duplication transmission for the bearer is in an activated state, and when the network device receives the indication information, it starts a duplication transmission timer corresponding to MAC layer duplication transmission for the bearer; for example, when the terminal determines that the RLC layer duplication transmission needs to be deactivated for a certain bearer, and when the terminal deactivates the RLC layer duplication transmission, the terminal sends indication information to the network device, so as to inform the network device that the RLC layer duplication transmission for the bearer is in a deactivated state, and when the network device receives the indication information, the terminal starts a duplication transmission timer corresponding to the RLC layer duplication transmission for the bearer.

B22, detailed behavior of network device during running of timer

It should be noted that, during the running period of the duplication transmission timer corresponding to the first duplication transmission of the target bearer, the network device is prohibited from sending the activation signaling or the deactivation signaling of the first duplication transmission to the terminal.

That is, the network device cannot change the state of the first duplication transmission during the operation of the duplication transmission timer corresponding to the first duplication transmission; for example, when the network device sends a deactivation signaling for duplication transmission of the RLC layer of a certain bearer, the network device starts a duplication transmission timer corresponding to the duplication transmission of the RLC layer for the bearer, and during the operation of the duplication transmission timer corresponding to the duplication transmission of the RLC layer of the bearer, the network device cannot change the state of the duplication transmission of the RLC layer for the bearer (i.e., cannot send an RLC layer duplication transmission activation signaling for the bearer to the terminal), that is, during the operation of the duplication transmission timer corresponding to the duplication transmission of the RLC layer of the bearer, the duplication transmission of the RLC layer of the bearer is always in a deactivation state; for example, when the network device sends activation signaling for duplication transmission of the PDCP layer of a certain bearer, a duplication transmission timer corresponding to the duplication transmission of the PDCP layer is started for the bearer, and during the operation of the duplication transmission timer corresponding to the duplication transmission of the PDCP layer of the bearer, the network device cannot change the state of the duplication transmission of the PDCP layer for the bearer (i.e., cannot send a duplication transmission deactivation signaling for the PDCP layer of the bearer to the terminal), that is, during the operation of the duplication transmission timer corresponding to the duplication transmission of the PDCP layer for the bearer, the duplication transmission of the PDCP layer of the bearer is always in an activation state.

B23, detailed behaviors of the network device when the timer expires

It should be noted that, after the duplication transmission timer corresponding to the first duplication transmission of the target bearer expires, the network device is allowed to send the activation signaling or the deactivation signaling of the first duplication transmission.

That is to say, after the duplication transmission timer corresponding to the first duplication transmission is expire, the network device may change the state of the first duplication transmission according to its specific requirement; for example, when the network device sends a deactivation signaling for duplication transmission of the RLC layer of a certain bearer, the network device starts a duplication transmission timer corresponding to the duplication transmission of the RLC layer for the bearer, and after the duplication transmission timer corresponding to the duplication transmission of the RLC layer of the bearer expires, the network device may send an activation signaling for duplication transmission of the RLC layer, and activate the duplication transmission of the RLC layer; for example, after the network device sends an activation signaling for the PDCP layer duplication transmission of the bearer, starts a duplication transmission timer corresponding to the PDCP layer duplication transmission of the bearer, and after the duplication transmission timer corresponding to the PDCP layer duplication transmission of the bearer expires, the network device may send a deactivation signaling for the PDCP layer duplication transmission of the bearer, and deactivate the PDCP layer duplication transmission of the bearer.

It should be noted that, in this implementation manner, a behavior of the network device for activating/deactivating the first duplication transmission may be restricted, and during a running period of a timer corresponding to the first duplication transmission, the network device may not send an activation or deactivation signaling of the first duplication transmission, and only if the timer corresponding to the first duplication transmission is expire, the activation or deactivation signaling of the first duplication transmission may be sent, so that the network device may be prevented from performing ping-pong handover between a first duplication transmission activation state and a first duplication transmission deactivation state.

It should be noted that, in the embodiment of the present disclosure, by maintaining the duplication transmission timer for the first duplication transmission, not only can ping-pong switching between the activated state and the deactivated state when the terminal autonomously activates the duplication transmission be avoided, but also the problem that the cell used for data transmission is limited and the resource cannot be effectively utilized because the terminal maintains the activated state for a long time without the requirement of the duplication transmission can be avoided, thereby ensuring the effective utilization of the resource and the effective transmission of the data.

Figure 7:
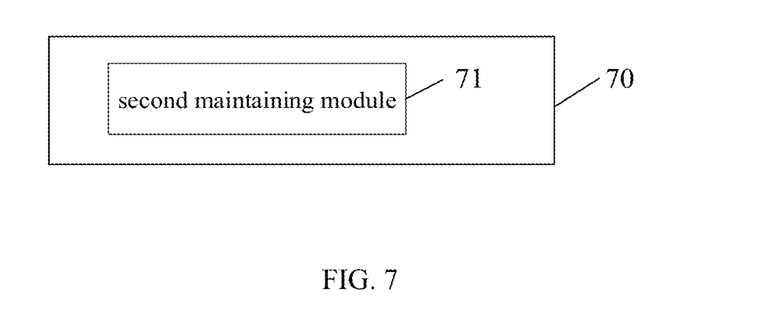
FIG. 7 is a block schematic diagram of a network device according to an embodiment of the disclosure.

As shown in FIG. 7, an embodiment of the present disclosure provides a network device 70, including:

a second maintaining module 71, configured to maintain a duplication transmission timer for the first duplication transmission of the target bearer.

Specifically, the target bearer is a bearer that has activated the first duplication transmission.

Specifically, the first duplication transmission includes: one of packet data convergence protocol PDCP layer duplication transmission, radio link control RLC layer duplication transmission, medium access control MAC layer duplication transmission, and physical layer duplication transmission.

Optionally, the second maintaining module 71 is configured to perform at least one of:
sending an activation signaling of the first duplication transmission of the target bearer to a terminal, and starting a duplication transmission timer corresponding to the first duplication transmission of the target bearer;
the receiving terminal determines the indication information for activating the first duplication transmission for the target bearer and starts a duplication transmission timer corresponding to the first duplication transmission of the target bearer.

Further, the second maintaining module 71 is further configured to perform at least one of:
during the running period of a duplication transmission timer corresponding to the first duplication transmission of the target bearer, sending an activation signaling for the first duplication transmission of the target bearer to a terminal, and restarting the duplication transmission timer corresponding to the first duplication transmission;
restarting the duplication transmission timer corresponding to the first duplication transmission once when the first duplication transmission sent by the terminal is received once during the running period of the duplication transmission timer corresponding to the first duplication transmission of the target bearer.

Further, the second maintaining module 71 is further configured to perform:
when the duplication transmission timer expires, determining that the first duplication transmission of the target bearer is in a deactivation state.

Optionally, the second maintaining module 71 is configured to perform at least one of:
sending an activation signaling or a deactivation signaling for first duplication transmission of a target bearer to a terminal, and starting a duplication transmission timer corresponding to the first duplication transmission of the target bearer;
the receiving terminal determines the indication information for activating or deactivating the first duplication transmission for the target bearer and starts a duplication transmission timer corresponding to the first duplication transmission of the target bearer.

Further, the second maintaining module 71 is further configured to perform at least one of:
during the running period of a duplication transmission timer corresponding to the first duplication transmission of the target bearer, forbidding the network device to send an activation signaling or a deactivation signaling of the first duplication transmission to the terminal; or
after the duplication transmission timer corresponding to the first duplication transmission of the target bearer is expire, allowing the network device to send the activation signaling or the deactivation signaling of the first duplication transmission.

It should be noted that the network device embodiment is a network device corresponding to the above method embodiment one to one, and all implementation manners in the above method embodiment are applicable to the network device embodiment, and the same technical effect can also be achieved.

Figure 8:
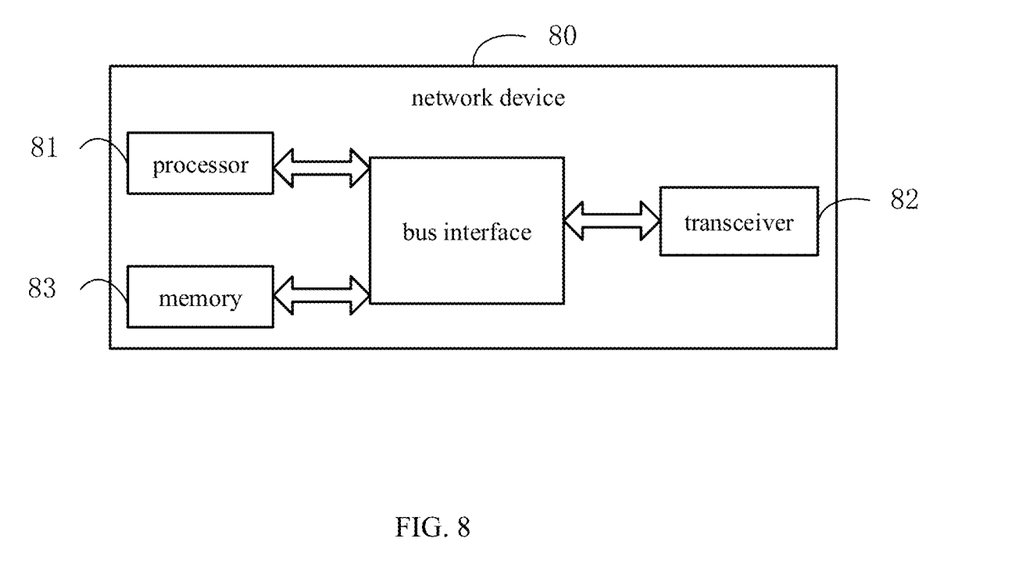
FIG. 8 is a block diagram of a network device of an embodiment of the disclosure.

As shown in FIG. 8, an embodiment of the present disclosure further provides a network device 80, which includes a processor 81, a transceiver 82, a memory 83, and a program stored in the memory 83 and operable on the processor 81; the transceiver 82 is connected to the processor 81 and the memory 83 through a bus interface, where the processor 81 is configured to read a program in the memory and perform the following processes:

a duplication transmission timer is maintained for a first duplication transmission of a target bearer.

It should be noted that in FIG. 8, the bus architecture may include any number of interconnected buses and bridges, with one or more processors represented by processor 81 and various circuits represented by memory 83 being linked together. The bus architecture may also link together various other circuits such as peripherals, voltage regulators, power management circuits, and the like, which are well known in the art, and therefore, will not be described any further herein. The bus interface provides an interface. The transceiver 82 may be a plurality of elements including a transmitter and a receiver that provide a means for communicating with various other apparatus over a transmission medium. The processor 81 is responsible for managing the bus architecture and general processing, and the memory 83 may store data used by the processor 81 in performing operations.

Specifically, the target bearer is a bearer that has activated the first duplication transmission.

Specifically, the first duplication transmission includes: one of packet data convergence protocol PDCP layer duplication transmission, radio link control RLC layer duplication transmission, medium access control MAC layer duplication transmission, and physical layer duplication transmission.

Optionally, when the processor performs the program for maintaining the duplication transmission timer for the first duplication transmission of the target bearer, at least one of the following is implemented:

sending an activation signaling of the first duplication transmission of the target bearer to a terminal through a transceiver 82, and starting a duplication transmission timer corresponding to the first duplication transmission of the target bearer;

receiving indication information that the terminal determines to activate the first duplication transmission for the target bearer through the transceiver 82, and starting a duplication transmission timer corresponding to the first duplication transmission of the target bearer.

Further, when the processor performs the program for maintaining the duplication transmission timer for the first duplication transmission of the target bearer, at least one of the following is also implemented:

during the running period of the duplication transmission timer corresponding to the first duplication transmission of the target bearer, sending an activation signaling for the first duplication transmission of the target bearer to the terminal through the transceiver 82, and restarting the duplication transmission timer corresponding to the first duplication transmission;

restarting the duplication transmission timer corresponding to the first duplication transmission once when the first duplication transmission sent by the terminal is received once during the running period of the duplication transmission timer corresponding to the first duplication transmission of the target bearer.

Further, when the processor performs the program for maintaining the duplication transmission timer for the first duplication transmission of the target bearer, the processor further implements:

when the duplication transmission timer expires, determining that the first duplication transmission of the target bearer is in a deactivation state.

Optionally, when the processor performs the program for maintaining the duplication transmission timer for the first duplication transmission of the target bearer, at least one of the following is implemented:

sending an activation signaling or a deactivation signaling for the first duplication transmission of the target bearing to a terminal through a transceiver 82, and starting a duplication transmission timer corresponding to the first duplication transmission of the target bearing;

receiving indication information that the terminal determines to activate or deactivate the first duplication transmission for the target bearer through the transceiver 82, and starting a duplication transmission timer corresponding to the first duplication transmission of the target bearer.

Further, when the processor performs the program for maintaining the duplication transmission timer for the first duplication transmission of the target bearer, at least one of the following is also implemented:

during the running period of a duplication transmission timer corresponding to the first duplication transmission of the target bearer, forbidding the network device to send an activation signaling or a deactivation signaling of the first duplication transmission to the terminal;

after the duplication transmission timer corresponding to the first duplication transmission of the target bearer is expire, allowing the network device to send the activation signaling or the deactivation signaling of the first duplication transmission.

The network device may be a Base Station (BTS) in Global System for Mobile communications (GSM) or Code Division Multiple Access (CDMA), a Base Station (NodeB, NB) in Wideband Code Division Multiple Access (WCDMA), an evolved Node B (eNB, eNodeB) in LTE, a relay Station or an Access point, or a Base Station ng-NB (next Generation Node B) or a Central Unit (CU) or a distributed Unit (distribution Unit, DU) in a future 5G network, which is not limited herein.

The disclosed embodiments also provide a computer-readable storage medium, on which a computer program is stored, where the computer program, when performed by a processor, implements the steps of the duplication transmission maintaining method applied to a network device.

It should be noted that the division of each module is only a logical division, and all or part of the actual implementation may be integrated into one physical entity or may be physically separated. And these modules can all be implemented in the form of software invoked by a processing element; or can be implemented in the form of hardware; and part of the modules can be realized in the form of calling software by the processing element, and part of the modules can be realized in the form of hardware. For example, the determining module may be a processing element separately set up, or may be integrated into a chip of the apparatus, or may be stored in a memory of the apparatus in the form of program code, and a processing element of the apparatus calls and performs the function of the determining module. The other modules are implemented similarly. In addition, all or part of the modules can be integrated together or can be independently realized. The processing element described herein may be an integrated circuit having signal processing capabilities. In implementation, each step of the above method or each module above may be implemented by an integrated logic circuit of hardware in a processor element or an instruction in the form of software.

For example, the various modules, units, sub-units or sub-modules may be one or more integrated circuits configured to perform the above methods, such as: one or more Application Specific Integrated Circuits (ASICs), or one or more microprocessors (DSPs), or one or more Field Programmable Gate Arrays (FPGAs), among others. For another example, when some of the above modules are implemented in the form of a Processing element scheduler code, the Processing element may be a general-purpose processor, such as a Central Processing Unit (CPU) or other processor that can call the program code. As another example, these modules may be integrated together and implemented in the form of a system-on-a-chip (SOC).

The terms "first," "second," and the like in the description and in the claims of the present disclosure are used for distinguishing between similar elements and not necessarily for describing a particular sequential or chronological order. It is to be understood that the data so used may be interchanged under appropriate circumstances such that embodiments of the disclosure described herein may be implemented, for example, in sequences other than those illustrated or described herein. Moreover, the terms "includes," "including," and "having," and any variations thereof, are intended to cover a non-exclusive inclusion, such that a process, method, system, article, or apparatus that includes a list of steps or elements is not necessarily limited to those steps or elements expressly listed, but may include other steps or elements not expressly listed or inherent to such process, method, article, or apparatus. Further, the use of "and/or" in the specification and claims means that at least one of the connected objects, such as a and/or B and/or C, means that 7 cases are included that include a alone, B alone, C alone, and both a and B, B and C, a and C, and A, B and C. Similarly, the use of "at least one of A and B" in the specification and claims is to be understood as "A alone, B alone, or both A and B present".

While the foregoing is directed to alternative embodiments of the present disclosure, it will be appreciated by those skilled in the art that numerous modifications and adaptations may be made without departing from the principles set forth in the disclosure and are intended to be within the scope of the disclosure.

What is claimed is:

1. A duplication transmission maintaining method, applied to a terminal and comprising:
   maintaining a duplication transmission timer for a duplication transmission of a target bearer;
   wherein the duplication transmission comprises a packet data convergence protocol PDCP layer duplication transmission, a radio link control RLC layer duplication transmission, a medium access control MAC layer duplication transmission and a physical layer duplication transmission, wherein the maintaining the duplication transmission timer for the duplication transmission of the target bearer comprises:
   maintaining a duplication transmission timer corresponding to the PDCP layer duplication transmission for the PDCP layer duplication transmission of the target bearer;
   maintaining a duplication transmission timer corresponding to the RLC layer duplication transmission for the RLC layer duplication transmission of the target bearer;
   maintaining a duplication transmission timer corresponding to the MAC layer duplication transmission for the MAC layer duplication transmission of the target bearer; or
   maintaining a duplication transmission timer corresponding to the physical layer duplication transmission for the physical layer duplication transmission of the target bearer;
   wherein the duplication transmission timer corresponding to the PDCP layer duplication transmission, the duplication transmission timer corresponding to the RLC layer duplication transmission, the duplication transmission timer corresponding to the MAC layer duplication transmission and the duplication transmission timer corresponding to the physical layer duplication transmission are different from each other;
   wherein the maintaining the duplication transmission timer for the duplication transmission of the target bearer comprises at least one of:
   receiving an activation signaling for the duplication transmission of the target bearer and sent by a network device, and starting the duplication transmission timer corresponding to the duplication transmission of the target bearer; or
   starting the duplication transmission timer corresponding to the duplication transmission of the target bearer in response to determining to activate the duplication transmission for the target bearer;
   wherein the maintaining the duplication transmission timer for the duplication transmission of the target bearer further comprises:
   deactivating the duplication transmission of the target bearer when the duplication transmission timer expires.

2. The duplication transmission maintaining method according to claim 1, wherein the target bearer is a bearer of which the duplication transmission is activated.

3. The duplication transmission maintaining method according to claim 1, wherein a timing duration of the duplication transmission timer is preconfigured or configured by the network device.

4. The duplication transmission maintaining method according to claim 1, wherein the maintaining the duplication transmission timer for the duplication transmission of the target bearer further comprises at least one of:
   during a running period of the duplication transmission timer corresponding to the duplication transmission of the target bearer, receiving the activation signaling for the duplication transmission of the target bearer and sent by the network device, and restarting the duplication transmission timer corresponding to the duplication transmission; or
   during the running period of the duplication transmission timer corresponding to the duplication transmission of the target bearer, restarting the duplication transmission timer corresponding to the duplication transmission every time the terminal performs the duplication transmission.

5. The duplication transmission maintaining method according to claim 1, wherein the maintaining the duplication transmission timer for the duplication transmission of the target bearer comprises at least one of:
   receiving the activation signaling or a deactivation signaling for the duplication transmission of the target bearer and sent by the network device, and starting the duplication transmission timer corresponding to the duplication transmission of the target bearer; or
   determining to activate or deactivate the duplication transmission for the target bearer and starting the duplication transmission timer corresponding to the duplication transmission of the target bearer;

wherein the maintaining the duplication transmission timer for the duplication transmission of the target bearer further comprises at least one of:

during a running period of the duplication transmission timer corresponding to the duplication transmission of the target bearer, prohibiting the terminal from activating or deactivating the duplication transmission; or after the duplication transmission timer for the duplication transmission of the target bearer expires, allowing the terminal to activate or deactivate the duplication transmission.

6. A duplication transmission maintaining method, applied to a network device and comprising:

maintaining a duplication transmission timer for a duplication transmission of a target bearer;

wherein the duplication transmission comprises a packet data convergence protocol PDCP layer duplication transmission, a radio link control RLC layer duplication transmission, a medium access control MAC layer duplication transmission and a physical layer duplication transmission, wherein the maintaining the duplication transmission timer for the duplication transmission of the target bearer comprises:

maintaining a duplication transmission timer corresponding to the PDCP layer duplication transmission for the PDCP layer duplication transmission of the target bearer;

maintaining a duplication transmission timer corresponding to the RLC layer duplication transmission for the RLC layer duplication transmission of the target bearer;

maintaining a duplication transmission timer corresponding to the MAC layer duplication transmission for the MAC layer duplication transmission of the target bearer; or maintaining a duplication transmission timer corresponding to the physical layer duplication transmission for the physical layer duplication transmission of the target bearer;

wherein the duplication transmission timer corresponding to the PDCP layer duplication transmission, the duplication transmission timer corresponding to the RLC layer duplication transmission, the duplication transmission timer corresponding to the MAC layer duplication transmission and the duplication transmission timer corresponding to the physical layer duplication transmission are different from each other;

wherein the maintaining the duplication transmission timer for the duplication transmission of the target bearer comprises at least one of:

sending an activation signaling for the duplication transmission of the target bearer to a terminal, and starting the duplication transmission timer corresponding to the duplication transmission of the target bearer; or starting the duplication transmission timer corresponding to the duplication transmission of the target bearer in response to receiving indication information indicating that the terminal determines to activate the duplication transmission for the target bearer;

wherein the maintaining the duplication transmission timer for the duplication transmission of the target bearer further comprises:

determining that the duplication transmission of the target bearer is deactivated, when the duplication transmission timer expires.

7. The duplication transmission maintaining method according to claim 6, wherein the target bearer is a bearer of which the duplication transmission is activated.

8. A network device, comprising: a memory, a processor and a program stored in the memory and executable by the processor, wherein the processor is configured to execute the program to perform the duplication transmission maintaining method according to claim 6.

9. The network device according to claim 8, wherein the target bearer is a bearer of which the duplication transmission is activated.

10. The duplication transmission maintaining method according to claim 6, wherein the maintaining the duplication transmission timer for the duplication transmission of the target bearer further comprises at least one of:

during a running period of the duplication transmission timer corresponding to the duplication transmission of the target bearer, sending the activation signaling for the duplication transmission of the target bearer to the terminal, and restarting the duplication transmission timer corresponding to the duplication transmission; or during the running period of the duplication transmission timer corresponding to the duplication transmission of the target bearer, restarting the duplication transmission timer corresponding to the duplication transmission every time receiving the duplication transmission sent by the terminal.

11. The duplication transmission maintaining method according to claim 6, wherein the maintaining the duplication transmission timer for the duplication transmission of the target bearer comprises at least one of:

sending the activation signaling or a deactivation signaling for the duplication transmission of the target bearer to the terminal, and starting the duplication transmission timer corresponding to the duplication transmission of the target bearer; or receiving indication information indicating that the terminal determines to activate or deactivate the duplication transmission for the target bearer and starting the duplication transmission timer corresponding to the duplication transmission of the target bearer;

wherein the maintaining the duplication transmission timer for the duplication transmission of the target bearer further comprises at least one of:

during a running period of the duplication transmission timer corresponding to the duplication transmission of the target bearer, prohibiting the network device from sending the activation signaling or the deactivation signaling for the duplication transmission to the terminal; or after the duplication transmission timer for the duplication transmission of the target bearer expires, allowing the network device to send the activation signaling or the deactivation signaling for the duplication transmission to the terminal.

12. A terminal, comprising: a memory, a processor and a program stored in the memory and executable by the processor, wherein the processor is configured to execute the program to perform:

maintaining a duplication transmission timer for a duplication transmission of a target bearer;

wherein the duplication transmission comprises a packet data convergence protocol PDCP layer duplication transmission, a radio link control RLC layer duplication transmission, a medium access control MAC layer duplication transmission and a physical layer duplication transmission, wherein the maintaining the duplication transmission timer for the duplication transmission of the target bearer comprises:

maintaining a duplication transmission timer corresponding to the PDCP layer duplication transmission for the PDCP layer duplication transmission of the target bearer;

maintaining a duplication transmission timer corresponding to the RLC layer duplication transmission for the RLC layer duplication transmission of the target bearer;

maintaining a duplication transmission timer corresponding to the MAC layer duplication transmission for the MAC layer duplication transmission of the target bearer; or maintaining a duplication transmission timer corresponding to the physical layer duplication transmission for the physical layer duplication transmission of the target bearer;

wherein the duplication transmission timer corresponding to the PDCP layer duplication transmission, the duplication transmission timer corresponding to the RLC layer duplication transmission, the duplication transmission timer corresponding to the MAC layer duplication transmission and the duplication transmission timer corresponding to the physical layer duplication transmission are different from each other;

wherein the processor is configured to execute the program to perform at least one of:

receiving an activation signaling for the duplication transmission of the target bearer and sent by a network device, and starting the duplication transmission timer corresponding to the duplication transmission of the target bearer; or starting the duplication transmission timer corresponding to the duplication transmission of the target bearer in response to determining to activate the duplication transmission for the target bearer;

wherein the processor is configured to execute the program to perform:

deactivating the duplication transmission of the target bearer when the duplication transmission timer expires.

13. The terminal according to claim 12, wherein the target bearer is a bearer of which the duplication transmission is activated.

14. The terminal according to claim 12, wherein the processor is configured to execute the program to perform at least one of:

during a running period of the duplication transmission timer corresponding to the duplication transmission of the target bearer, receiving the activation signaling for the duplication transmission of the target bearer and sent by the network device, and restarting the duplication transmission timer corresponding to the duplication transmission; or during the running period of the duplication transmission timer corresponding to the duplication transmission of the target bearer, restarting the duplication transmission timer corresponding to the duplication transmission every time the terminal performs the duplication transmission.

15. The terminal according to claim 12, wherein the processor is configured to execute the program to perform at least one of:

receiving the activation signaling or a deactivation signaling for the duplication transmission of the target bearer and sent by the network device, and starting the duplication transmission timer corresponding to the duplication transmission of the target bearer; or determining to activate or deactivate the duplication transmission for the target bearer and starting the duplication transmission timer corresponding to the duplication transmission of the target bearer;

wherein the processor is configured to execute the program to perform at least one of:

during a running period of the duplication transmission timer corresponding to the duplication transmission of the target bearer, prohibiting the terminal from activating or deactivating the duplication transmission; or after the duplication transmission timer for the duplication transmission of the target bearer expires, allowing the terminal to activate or deactivate the duplication transmission.

* * * * *